United States Patent [19]

Barkan

[11] Patent Number: 5,619,028
[45] Date of Patent: *Apr. 8, 1997

[54] DIGITIZER FOR A BAR CODE READER UTILIZING A FIRST DERIVATIVE SIGNAL AND AN ANALOG GROUND COMPARISON SIGNAL

[75] Inventor: Edward Barkan, Miller Place, N.Y.

[73] Assignee: Symbol Technologies, Inc., Holtsville, N.Y.

[ * ] Notice: The term of this patent shall not extend beyond the expiration date of Pat. No. 5,408,081.

[21] Appl. No.: 465,104

[22] Filed: Jun. 5, 1995

Related U.S. Application Data

[60] Division of Ser. No. 257,668, Jun. 8, 1994, Pat. No. 5,446,272, which is a continuation-in-part of Ser. No. 28,107, Mar. 8, 1993, Pat. No. 5,408,081, and Ser. No. 721,951, Jun. 27, 1991, abandoned, which is a division of Ser. No. 510,074, Apr. 13, 1990, Pat. No. 5,059,779, which is a continuation-in-part of Ser. No. 367,335, Jun. 16, 1989, Pat. No. 5,124,539.

[51] Int. Cl.[6] .................................................. G06K 7/10
[52] U.S. Cl. ............................................ 235/462; 235/463
[58] Field of Search ........................................ 235/462, 463; 360/46, 51

[56] References Cited

U.S. PATENT DOCUMENTS

| | | | |
|---|---|---|---|
| 3,360,659 | 12/1967 | Young | 250/236 |
| 3,685,723 | 8/1972 | Berler | 235/61.11 |
| 3,699,321 | 10/1972 | Gibson | 235/152 |
| 3,892,949 | 7/1975 | Dodson, III | 235/61.11 |
| 4,000,397 | 12/1976 | Hebert et al. | 235/61.11 |
| 4,059,224 | 11/1977 | Seligman | 235/462 |
| 4,109,316 | 8/1978 | Snyder | 365/127 |
| 4,113,343 | 9/1978 | Pole et al. | 350/3.71 |
| 4,115,703 | 9/1978 | Dobras | 250/568 |
| 4,118,675 | 10/1978 | Rahn et al. | 331/945 |
| 4,158,435 | 6/1979 | Nakanishi et al. | 235/463 |
| 4,160,156 | 7/1979 | Sherer | 235/463 |
| 4,182,956 | 1/1980 | Funk, Jr. et al. | 250/239 |
| 4,210,802 | 7/1980 | Sakai | 235/483 |
| 4,277,127 | 7/1981 | Smith et al. | 350/3.67 |
| 4,305,646 | 12/1981 | Bechtold | 354/5 |
| 4,356,389 | 10/1982 | Quirey et al. | 235/455 |
| 4,455,485 | 6/1984 | Hosaka et al. | 250/234 |
| 4,528,444 | 7/1985 | Hara et al. | 235/462 |
| 4,560,862 | 12/1985 | Eastman et al. | 235/467 |
| 4,570,057 | 2/1986 | Chadima, Jr. et al. | 235/472 |
| 4,578,568 | 3/1986 | Tsuzuki | 235/436 |
| 4,578,571 | 3/1986 | Williams | 235/472 |
| 4,740,675 | 4/1988 | Brosnan et al. | 235/462 |
| 4,749,879 | 6/1988 | Peterson et al. | 307/354 |
| 4,760,248 | 7/1988 | Swartz et al. | 235/472 |
| 4,780,367 | 10/1988 | Nakase et al. | 328/168 |
| 4,795,224 | 1/1989 | Goto | 350/6.3 |
| 4,801,788 | 1/1989 | Osaka | 235/462 |
| 5,061,843 | 10/1991 | Sato et al. | 235/462 |
| 5,103,080 | 4/1992 | Barkan | 235/437 |
| 5,124,539 | 6/1992 | Krichever et al. | 235/472 |
| 5,210,397 | 5/1993 | Eastman | 235/436 |
| 5,272,323 | 12/1993 | Martino | 235/462 |
| 5,294,783 | 3/1994 | Hammond, Jr et al. | 235/462 |

FOREIGN PATENT DOCUMENTS

| | | |
|---|---|---|
| 61-59573 | 3/1986 | Japan . |
| 63-165979 | 7/1988 | Japan . |
| WO93/17396 | 9/1993 | WIPO . |

Primary Examiner—Donald T. Hajec
Assistant Examiner—Michael G. Lee
Attorney, Agent, or Firm—Finnegan, Henderson, Farabow, Garrett & Dunner

[57] ABSTRACT

A system for digitizing an analog electric signal generated from the photoelectronic conversion of reflected light when scanning indicia having spatially-separated, light-reflective portions, the system including a differentiator circuit for generating a first derivative signal representing a first derivative of the analog signal. An analog ground comparison circuit compares the first derivative signal and an analog ground comparison signal to generate an output signal indicating a change in the intensity of the reflected light. An output circuit generates a digital output signal corresponding to the digital signal.

21 Claims, 9 Drawing Sheets

DIGITIZER FOR A BAR CODE READER UTILIZING A FIRST DERIVATIVE SIGNAL AND AN ANALOG GROUND COMPARISON SIGNAL

CROSS REFERENCE TO RELATED APPLICATIONS

This is a divisional of application Ser. No. 08/257,668, filed 8 Jun. 1994, now U.S. Pat. No. 5,446,272, which is a continuation-in-part of application Ser. No. 08/028,107, filed 8 Mar. 1993, now U.S. Pat. No. 5,408,081, and a continuation-in-part of application Ser. No. 07/721,951, filed 27 Jun. 1991, now abandoned, which is a divisional of application Ser. No. 07/510,074, filed 13 Apr. 1990, now U.S. Pat. No. 5,059,779, which is a continuation-in-part of application Ser. No. 07/367,335, filed 16 Jun. 1989, now U.S. Pat. No. 5,124,539. The U.S. patent applications and Patents are herein incorporated by reference.

BACKGROUND OF THE INVENTION

1. Field of the Invention

This invention generally relates to a hand-held laser scanner for scanning and reading coded indicia, e.g. bar code symbols, with a first scan pattern and, more particularly, to a stand-alone fixture for selectively supporting the laser scanner thereon and, when so supported, for converting the first scan pattern to a different, second scan pattern operative for scanning and reading indicia located exteriorly of the fixture. Still more particularly, this invention relates to converting a hand-held scanner having a trigger, that initiates reading in a triggered mode when manually actuated, to a triggerless mode by simply mounting the scanner on the fixture, and also to supporting both triggered and triggerless hand-held scanners in the fixture, as well as to triggerless scanners in general. Furthermore, various digitizer circuits are disclosed for signal processing.

2. Description of Related Art

Hand-held laser scanners are well known. See, for example, U.S. Pat. Nos. 4,387,297; 4,409,470 and 4,806,742 as being representative of the art. A stand-alone laser scanning workstation, for example, see U.S. Pat. No. 4,369,361, having built-in laser, scanning and sensor components is also known. It is also known to provide a so-called "dummy" stand or fixture on which a hand-held laser scanner is optionally supported when not being held or used by a human operator. Such dummy stands typically serve mainly as convenient tabletop mounts or equipment perches to provide ready access of the scanner to the operator. In some cases, for example, see U.S. Pat. No. 5,105,070, the dummy stand is useful in changing the direction of a laser beam emitted by the supported scanner.

Each of the aforementioned hand-held scanners utilizes a trigger which, when manually actuated, initiates scanning and reading of the indicia. It has recently been proposed to provide a so-called "triggerless" hand-held laser scanner where, instead of a manually-operated trigger, the scanner employs an extra infrared light emitting diode (LED) and complementary infrared sensor, both mounted in a front end or nose of the scanner. When the nose is positioned close to a symbol, light from the LED reflects therefrom and is detected by the sensor. Additional control circuitry on-board the scanner turns on the laser and scanning components in response to such detection in order to initiate scanning and reading of the symbol.

The working range of this triggerless scanner is therefore limited by the sensing range of the infrared scanner. A symbol placed beyond the range of the sensor cannot be scanned because the sensor will not turn on the laser and scanning components. Moreover, aside from the additional expense of the infrared LED and sensor, this triggerless sensing technique can be inconvenient to use. To read another symbol, or to read the same symbol again, the scanner must be moved away from the symbol beyond the sensing range (e.g. about 15 cm) and then returned to be again positioned within sensing range. This can require large, tiring hand motions. In addition, the triggerless scanner is subject to many false reading attempts since any object positioned near the nose will turn the scanner on and, of course, this can include objects which bear no symbol.

It is also known in this art to construct a digital signal from an analog signal generated from a photoelectric transformation of light reflected off a symbol during scanning by using signal processing digitizing circuits which either use fixed threshold levels derived directly from the analog signal, or which compare a first derivative of the analog signal to a peak signal that follows that peaks of the analog signal. However, such known digitizing circuits are susceptible to errors due to such factors as high ambient light levels and noise, especially in cases where the reading beam spot is poorly focused, i.e., in long-range reading applications, or in reading very high density symbols.

SUMMARY OF THE INVENTION

Objects of the Invention

It is an object of this invention to provide a so-called "intelligent" fixture which not only selectively supports a hand-held laser scanner, but also serves as a hands-free workstation at which objects bearing coded indicia can be read.

It is another object of this invention to provide a hands-free intelligent workstation which converts the scan pattern emitted by a hand-held scanner to a different scan pattern.

Another object of this invention is to convert a single-line scan pattern emitted by a hand-held scanner to an omni-directional scan pattern of intersecting lines by the simple expedient of mounting the hand-held scanner on the fixture.

A further object of this invention is to provide a fixture which automatically converts a hand-held laser scanner having a trigger to a triggerless mode of operation when the scanner is mounted in the fixture.

Yet another object of this invention is to provide a novel triggerless scanner.

Another object of this invention is to provide a signal processing digitizing circuit that is resistant to noise, high ambient light levels, and poor focusing conditions, and still provide a true and faithful digital reconstruction of a symbol being scanned.

The invention further comprises a method of digitizing an analog electric signal generated from a photoelectronic conversion of light of scanning indicia having spatially-separated, light-reflective portions, the system including a first differentiator circuit for generating a first derivative signal representing a first derivative of the analog signal. An analog ground circuit generates a signal representative of analog ground. A clamping circuit clamps voltage peaks of the first derivative signal. A first comparator compares the analog ground signal to the clamped first derivative signal to generate a digital signal representing the indicia being scanned.

In a preferred embodiment a margin threshold circuit adjusts the digital signal by gating off the digital signal when the amplitude of the first derivative signal is less than a predetermined level.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Referring first to FIGS. 1–4 of the drawings, reference numeral 10 generally indentifies a lightweight (less than one pound), hand-held laser scanner supportable entirely by a user for use in a laser scanning system operative for reading, scanning and/or analysing coded indicia, and aimable both prior to, and during, the reading thereof, by the user at the indicia, each in its turn. The term "indicia" or "symbol", as used interchangeably herein, is intended to cover indicia composed of different portions having different light-reflective properties at the wavelength of the light source, e.g. a laser, being utilized. The indicia may be the omnipresent Universal Product Code (UPC) bar code symbol, or any of the black and white industrial symbols, e.g. Code 39, codabar, Interleaved 2 of 5, etc. The indicia may also be any alphabetic and/or numeric characters. The term "symbol" is also intended to cover indicia located in a background field, wherein the indicia, or at least a portion thereof, have a different light-reflectively property than that for the background field. In this latter definition, the "reading" of the symbol is of particular benefit in the fields of robotics and object recognition.

Figure 1:
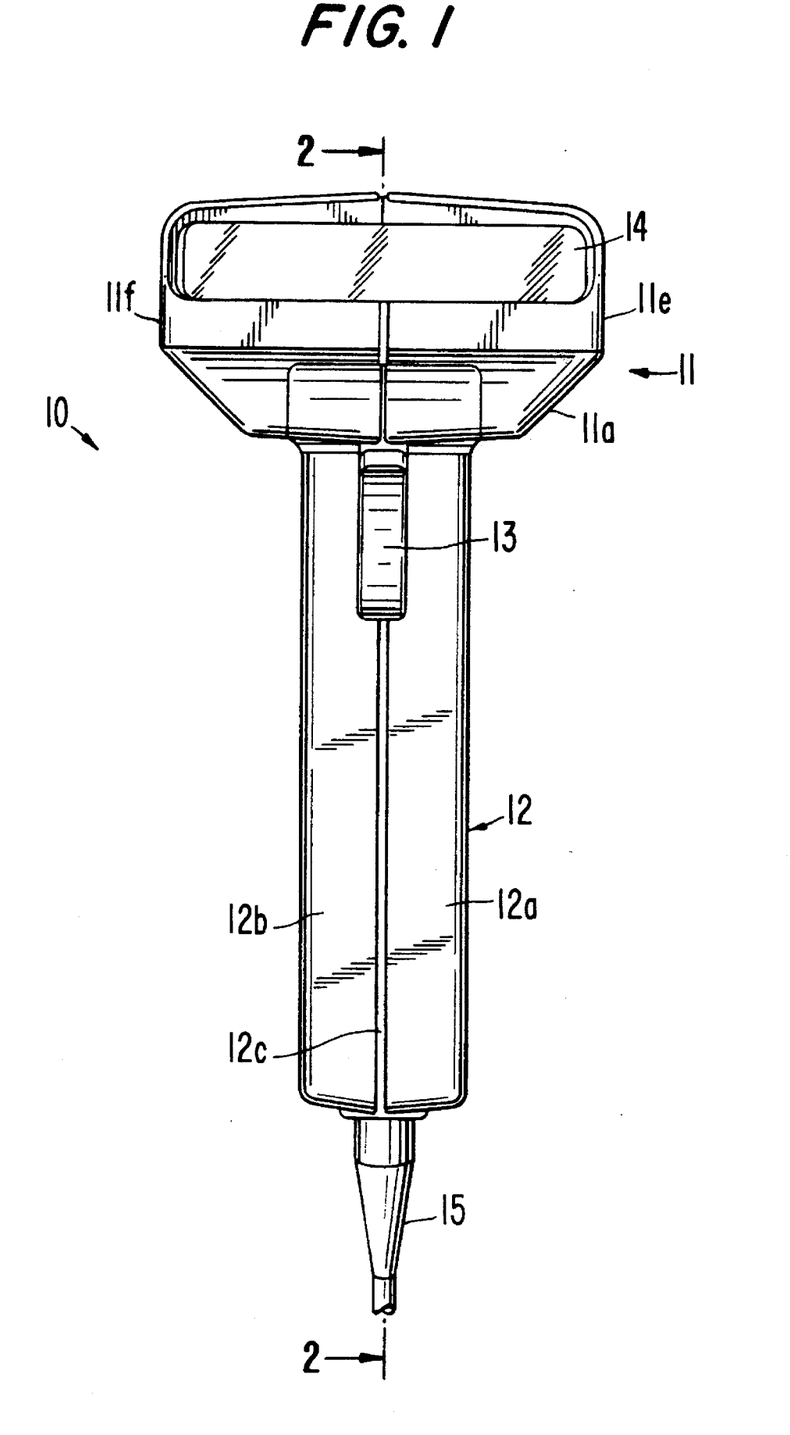
FIG. 1 is a front elevational view of a hand-held scanner.

Turning now to FIG. 1, the scanner 10 includes a generally gun-shaped housing having a handle portion 12 of generally rectangular cross-section and generally elongated along a handle axis, and a generally horizontally-elongated barrel or body portion 11. The cross-sectional dimension and overall size of the handle portion 12 is such that the scanner conveniently can fit and be held in a user's hand. The body and handle portions are constituted of a lightweight, resilient, shock-resistant, self-supporting material, such as a synthetic plastic material. The plastic housing preferably in injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the housing. The shell is formed of two housing parts 12a, 12b, meeting along a generally vertical joining line 12c.

Figure 4:
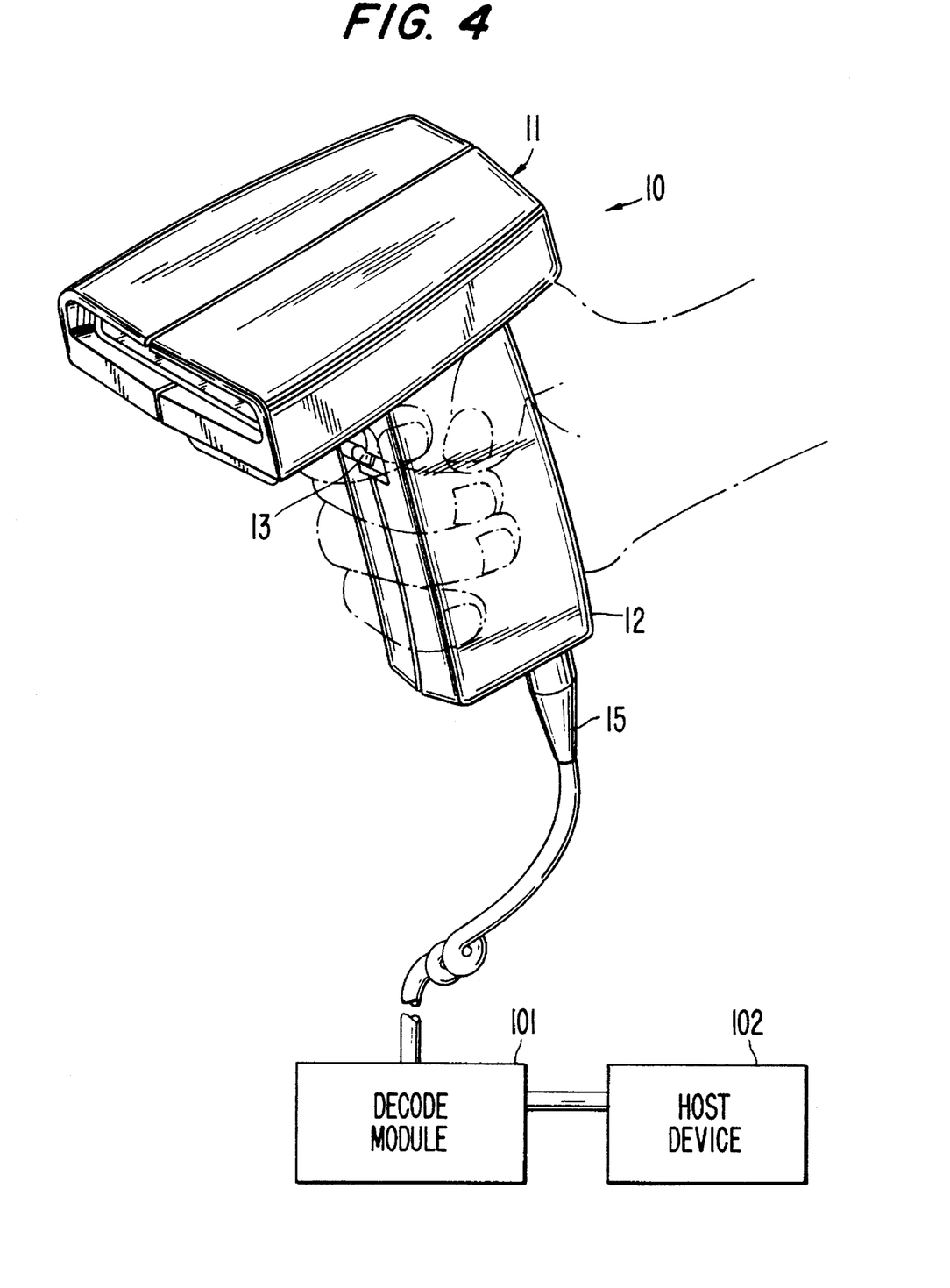
FIG. 4 is a perspective view of the scanner of FIG. 1 in one intended position of use.

As considered in one intended position of use, i.e. as a hand-held scanner as shown in FIG. 4, the body portion 11 has a front prow region or nose having an inclined front wall 11a. The body portion 11 also has a rear region or stern having a rear wall 11b spaced rearwardly of the inclined front wall 11a. The body below the top wall 11c, and a pair of opposed side walls 11e, 11f between the top and bottom walls. The front wall 11a is sloped relative to the top and bottom walls.

A manually-actuatable, and preferably depressible, trigger 13 is mounted on a cantilever resilient arm 13a for movement relative to the housing in a forwardly-facing region where the handle and body portions meet and where the user's forefinger normally lies when the user grips the handle portion in the intended position of use. The bottom wall 11d has a lower opening, and the handle 12 has a forwardly-facing slot through which the trigger 13 projects and is moved. The arm 13a has one end overlying a trigger switch 25 which is switched from an open to a closed state upon depression of the trigger 13.

An exit window 14 is stationarily mounted at the nose and is light-transmissive to allow laser light to pass from the interior to the exterior of the housing, and vice versa.

A flexible, non-bulky, coil-type electrical cable 15 with multiple freedoms of movement interconnects the scanner to the remainder of the components of the laser scanning system, whose operation is explained in greater detail below.

A plurality of components are mounted in the scanner and, as explained below, at least some of them are actuated by the trigger 13, either directly or indirectly, by means of a control microprocessor. One of the components is an actuatable laser light source (see FIG. 3), e.g. a semiconductor laser diode 33, operative, when actuated by the trigger 13, for propagating and generating an incident laser beam whose light is visible or at least marginally visible to the human eye. The emitted laser diode beam is highly divergent; diverges differently in different planes parallel and perpendicular to the longitudinal direction of beam propagation; is non-radially symmetrical, i.e. anamorphic; and has a beam cross-section generally resembling an oval. The diode may be of the continuous wave or pulse type. The diode requires a low voltage (e.g. 12 v DC or less) supplied by a power regulator and a battery (DC) source which may be provided within the scanner, or by a re-chargeable batter pack accessory detachably mounted on the scanner, or by a power conductor in the cable 15 connected to the scanner from an external power supply (e.g. DC source).

Referring again to FIG. 2, the returning portion of the scattered component of the reflected laser light has a variable light intensity, due to the different light-reflective properties of the various parts that comprise the symbol 100, over the symbol during the scan. The returning portion of the reflected laser light is collected by a generally concave, spherical collecting mirror 19a, and is a broad conical stress of light in a conical collecting volume centered on path 21c. The collecting mirror 19a reflects the collected conical light into the head along path 21b through a laser-light-transmissive element 106 to a sensor means, e.g. a photosensor 17. The photosensor 17, preferably a photodiode, detects the variable intensity which extends along, and preferably beyond, the linear scan, and generates an electrical analog signal indicative of the detected variable light intensity.

Figures 2, 3:
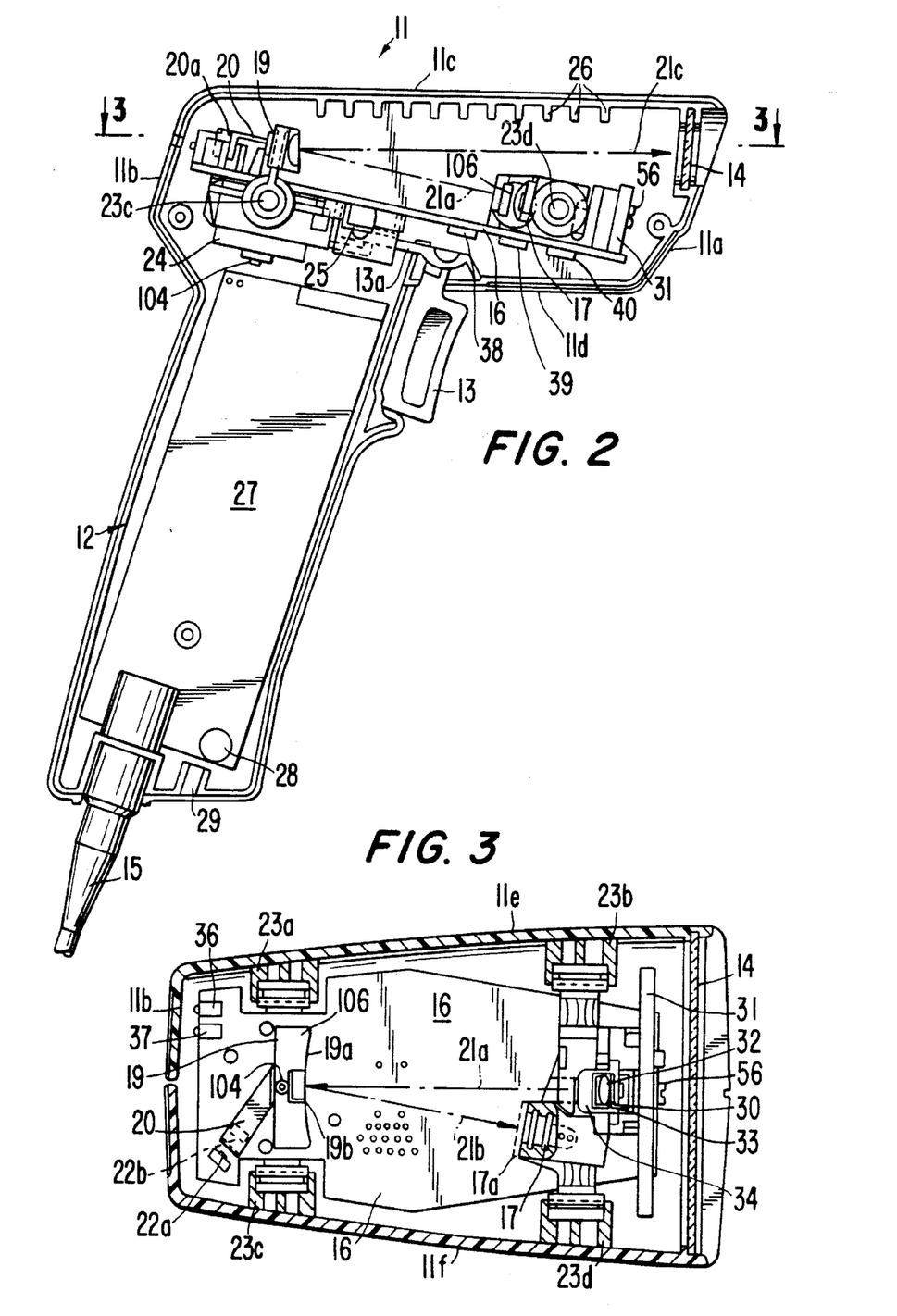
FIG. 2 is a sectional view taken on line 2—2 of FIG. 1.
FIG. 3 is a sectional view taken on line 3—3 of FIG. 2.

The collecting mirror 19a is also mounted on the support bracket 19 and, when the scanning mirror is actuated by the trigger, the collecting mirror is reciprocally and repetitively oscillated transversely, sweeping the field of view of the photodiode lengthwise across the symbol in a linear scan.

The scanning mirror and the collecting mirror are, in a preferred embodiment, of one-piece construction, but the scanning mirror can also be a discrete, small, planar mirror attached by glue, or molded in place, at the correct position and angle on a discrete, front surfaced, reflectively coated, concave mirror. The concave collecting mirror serves to collect the returning portion of the laser light and to focus the same on the photodiode.

Also mounted in the head are various electrical subcircuits mounted on board 16. For example, signal processing means 38 on board 16 are operative for processing the analog electrical signal generated by the sensor, and for generating a digitized video signal. Data descriptive of the symbol can be derived from the video signal. Suitable signal processing means for this purpose was described in U.S. Pat. No. 4,251,798. Component 39 on board 16 constitutes drive circuitry for the scanner motor, and suitable motor drive circuitry for this purpose was described in U.S. Pat. No. 4,387,297. Component 40 on board 16 is a voltage converter for energizing the laser diode 33. The entire contents of U.S. Pat. Nos. 4,251,798 and 4,387,297 are incorporated herein by reference and made part of the instant application.

The digitized video signal is conducted, in one embodiment, along cable 15 to decode/control module or means 101 (see FIG. 4) operative for decoding the digitized video signal to a digitized decoded signal from which the desired data descriptive of the symbol is obtained, in accordance with an algorithm contained in a software control program. The decode/control means includes a PROM for holding the control program, a RAM for temporary data storage, and a control microprocessor for controlling the PROM and RAM. The decode/control means determines when a successful decoding of the symbol has been obtained, and also terminates the reading of the symbol upon the determination of the successful decoding thereof. The initiation of the reading is caused by depression of the trigger. The decode/control means also includes control circuitry for controlling the actuation of the actuatable components in the head, as initiated by the trigger, as well as for communicating with the user that the reading has been automatically terminated as, for example, by sending control signals to indicator lamps 36, 37 (see FIG. 3) to illuminate the same.

The decoded signal is conducted to a remote, host computer 103 which serves essentially as a large data base, stores the decoded signal and, in some cases, provides information related to the decoded signal. For example, the host computer can provide retail price information corresponding to the objects identified by their decoded symbols.

In another embodiment, the decode/control means and a local data storage means are mounted on another printed circuit board 27 in the handle portion, and store multiple decoded signals which have been read. The stored signals thereupon can be down-loaded to a remote host computer. By providing the local data storage means, the use of the cable during the reading of the symbols can be eliminated—a feature which is very desirable in making the head as freely manipulatable as possible. A beeper 28 is also optionally mounted on board 27 so that the user can hear through a port 29 in the handle when a symbol has been successfully read. A battery pack is also mounted on the handle portion.

Figure 5A:
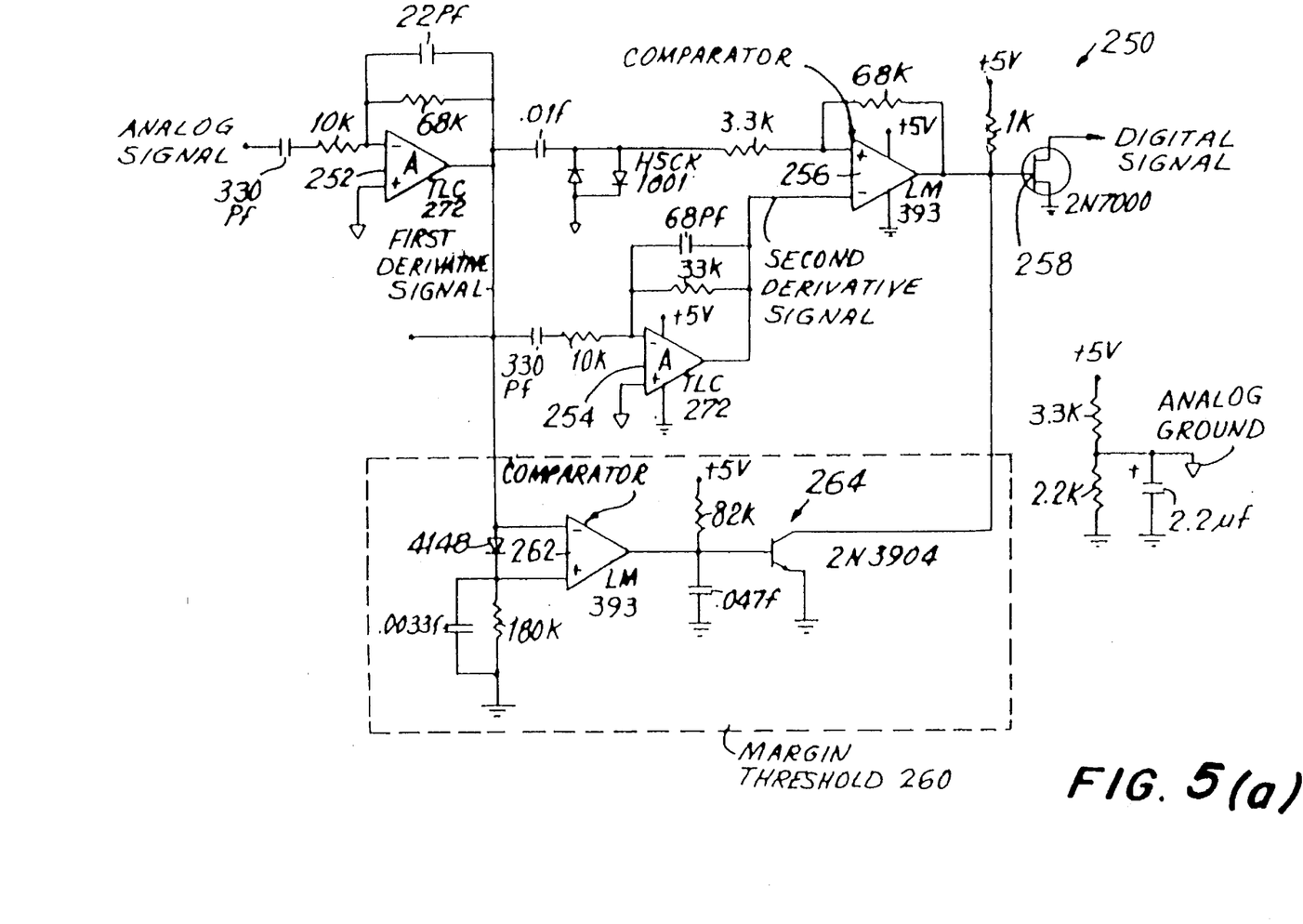
FIG. 5(a) is an electrical schematic diagram of still another embodiment of a signal processing digitizing circuit in accordance with this invention.
Figure 5B:
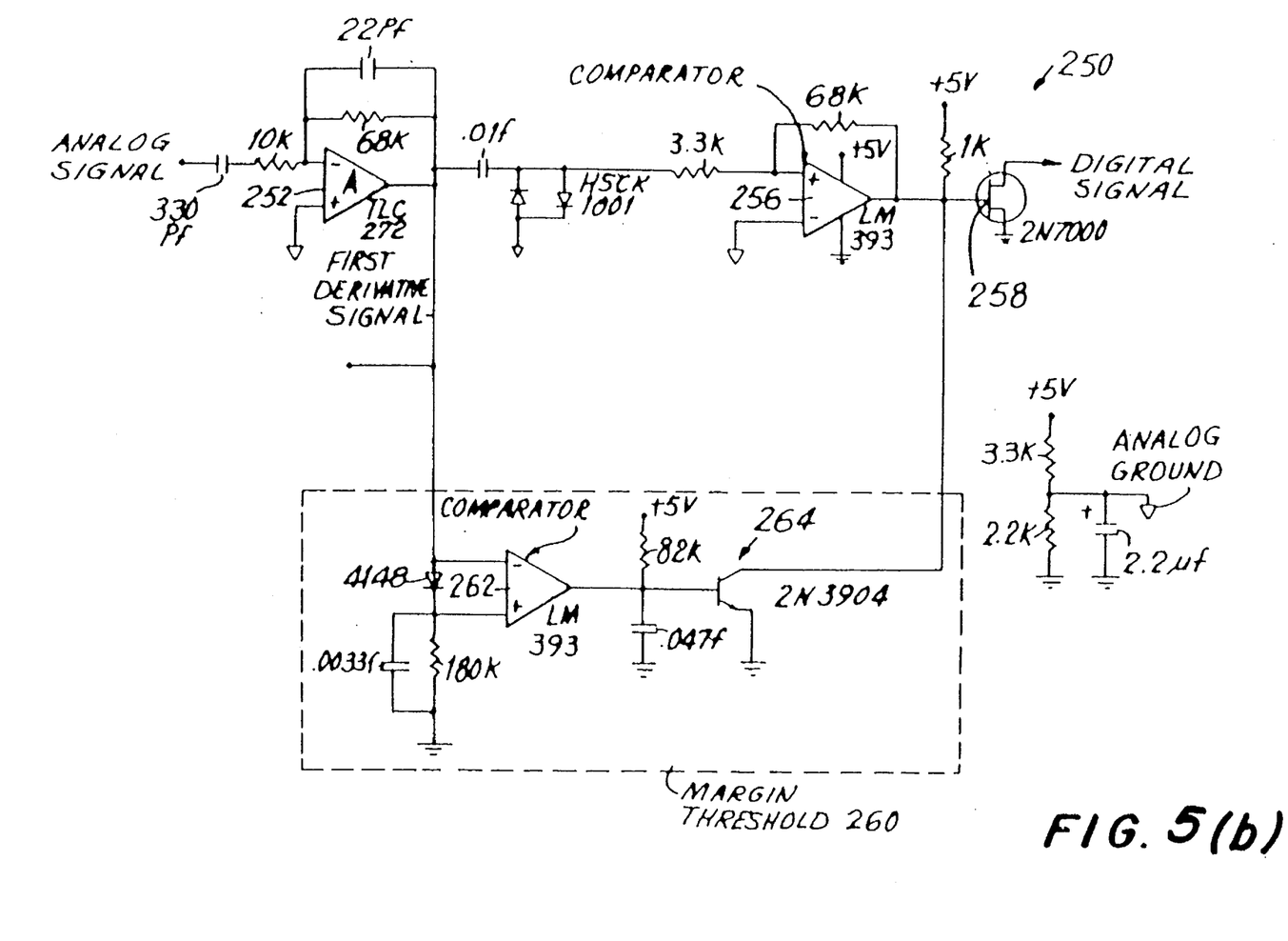
FIG. 5(b) is an electrical schematic diagram of an alternative embodiment of the digitizing circuit depicted in FIG. 5(a).

A simplified digitizing circuit 250 is depicted in FIGS. 5(a) and (b) and provides good digitizing accuracy even when the reading beam spot is much larger than the narrowest bars or spaces in the symbol being scanned. This makes it particularly good for use in long-range scanners, scanners for reading very high-density symbols, or scanners that are to be used where a large depth of focus is important. The digitizing circuit 250 can also provide excellent immunity to high levels of ambient light, including sunlight.

In FIG. 5(a), the analog signal is initially conducted to a first operational amplifier 252, preferably positioned early in a chain of amplifiers, configured as a differentiator to generate a first derivative signal. A second operational amplifier 254 configured as a differentiator is operative to generate a second derivative signal. A passive differentiator could be used here for simplicity. The first and second derivative signals are conducted to the pair of inputs of a comparator 256 whose digital output is conducted to a transistor 258. A margin threshold subcircuit 260 includes a comparator 262, one input of which is supplied with the first derivative signal, and the other input of which is grounded. The output of comparator 262 is conducted to the base of a transistor 264 whose collector is connected to the output of the comparator 256.

Figure 5C:
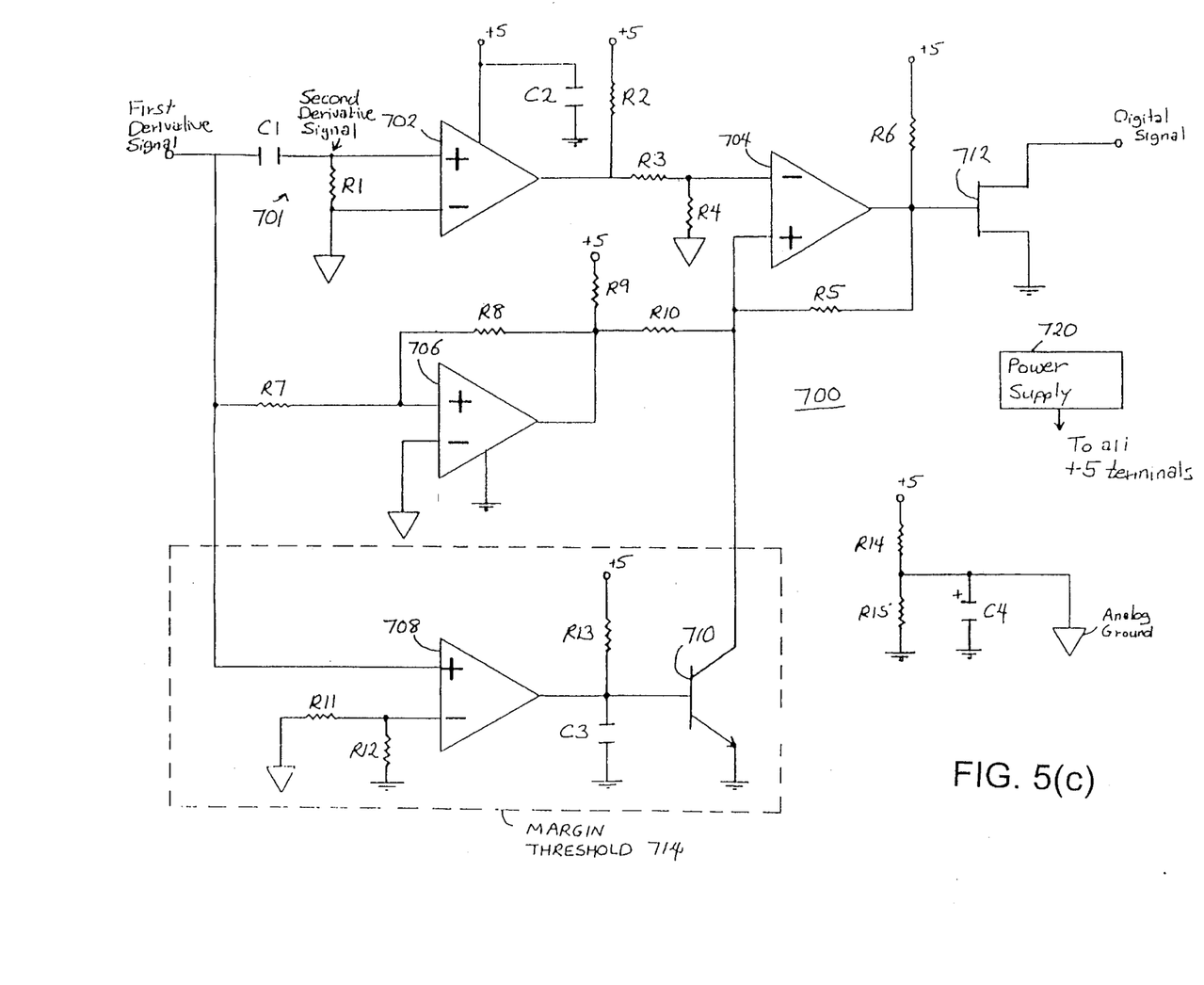
FIG. 5(c) is an electrical schematic diagram of another embodiment of a signal processing digitizing circuit in accordance with the invention.

FIG. 5(c) is another embodiment of the digitizing circuit 250 shown in FIG. 5(c). In the digitizing circuit of FIG. 5(c), the inverting input of comparator 256 is tied to an analog ground instead of a second derivative signal as shown in FIG. 5(c). The remaining portions of the embodiment of FIG. 5(c) is identical to the embodiment of FIG. 5(c).

FIG. 5(c) is an electrical schematic diagram of another embodiment of a signal processing digitizing circuit 700 in accordance with the present invention. The signal processing digitizing circuit in FIG. 5(c) is a minimized second derivative digitizer for standard range applications using an automatic gain control (AGC). This circuit also can be used for short range applications without an AGC (as in Laser Touch, for example). This circuit may need only a single +5 volt power supply 720.

As shown in FIG. 5(c), a first derivative signal of the analog signal corresponding to the bar code is applied to a differentiator circuit 701 which generates a second derivative signal. The differentiator circuit 701 includes capacitor C1 (680 pf, for example) and resistor R1 (10 k Ω, for example). The numerical values of these and the other capacitors and resistors are exemplary only the should not be considered as limiting the invention.

The second derivative signal is applied to the non-inverting input of a voltage comparator 702 (LM 339 may be used for all comparators in FIG. 5(c), as an example) whose inverting input is tied to analog ground. Comparator 702 thus detects the zero-crossings of the second derivative signal which indicates the inflection points of the analog signal transitions corresponding to the bar code.

The first derivative signal is also applied to the non-inverting input of a comparator 706. Comparator 706 is designed to have hysteresis to ensure that the first derivative signal triggers the comparator only for predetermined signal levels having a sufficient magnitude. The predetermined signal level is set to be unresponsive to undesired noise signals which might affect the bar code reading.

The signal output from the comparator 706 is applied to the non-inverting input of a comparator 704 and the output from comparator 702 is applied to the inverting input of comparator 704. Accordingly, the output of comparator 704 reflects signal transitions (zero-crossings) from the comparator 702 only on the first transition of the output of comparator 702 after a transition on the output of comparator 706. This circuit arrangement ignores noise so only the signal transitions above a predetermined level corresponding to the bar code are detected. The output of comparator 704 is buffered by a transistor 712 (2N7002, for example) before being sent from circuit 700.

The signal processing digitizing circuit 700 includes a margin threshold circuit 714 which sets a margin threshold value at a fixed DC voltage below zero. The margin threshold circuit 714 includes a comparator 708 which receives the first derivative signal at the non-inverting input. The amplitude of the output of comparator 708 is determined by a voltage divider including resistors R11 (3.3 k Ω, for example) and R12 (6.8 k Ω, for example), and the inverting input is tied to analog ground. The output of comparator 708 is transmitted to the base of a transistor 710 (2N3904, for example), whose collector is connected to the output of the comparator 704.

Margin threshold circuit 714 functions similar to a retriggerable one shot circuit that does not time out as long as it receives a continuous series of pulses, exceeding the set threshold, from the first derivative signal. When the pulses stop for a duration long enough for the circuit to time out, the digitized bar code output is forced to a white (space) state. When a margin area is encountered, the output of comparator 708 becomes high allowing C3 to charge through R13 which activates an inverting transistor 710 and thus, prohibits latch comparator 704 from passing an output signal. When a bar code symbol is scanned, however, the output of comparator 708 becomes low enough to discharge capacitor C3 and deactivate the inverting transistor 710, which allows latch comparator 704 to pass the output signal. In particular, the output of comparator 708 is connected to the base of transistor 710, which has its emitter grounded. When the output of comparator 708 goes "high," transistor 710 is turned on when C3 charges through R13.

The dynamic range of the digitizing circuit 700 is small because the trip points of the comparators are fixed and do not vary with the level of the signal fed to the circuit. Thus, best results are obtained when the signal level is regulated by an AGC to a predetermined value. The circuit can still accurately detect bar edges even if the signal level is not regulated well, except when the signal level is either too low or too high. A signal level is too low if it does not exceed the offset on the input of the margin comparator 708 and if it does not exceed the hysteresis of comparator 706. A signal level is too high if its noise levels are amplified to the point where noise unrelated to the bar code signal trips either one of comparators 706 and 708. There is a range in between these limits where the digitizing circuit 700 will operate properly and accurately, and the AGC insures that the signal will always stay within this range.

For the embodiment shown in FIG. 5(c), transitions from white to black correspond to negative peaks of the first derivative signal and transitions from black to white correspond to positive peaks of the first derivative signal.

Figure 5D:
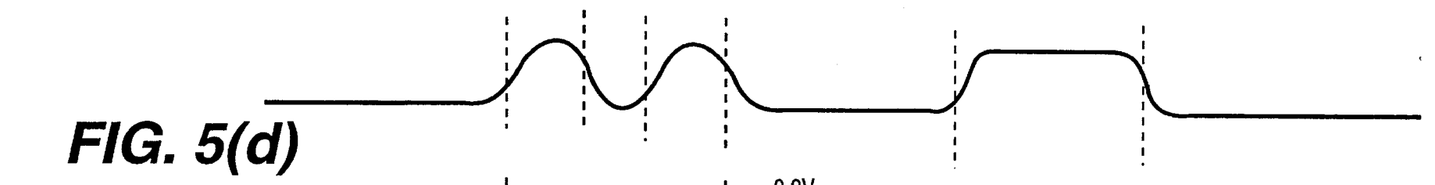
FIGS. 5(d)–5(h) are waveforms at various locations in the circuit of FIG. 5(a)
Figure 5E:
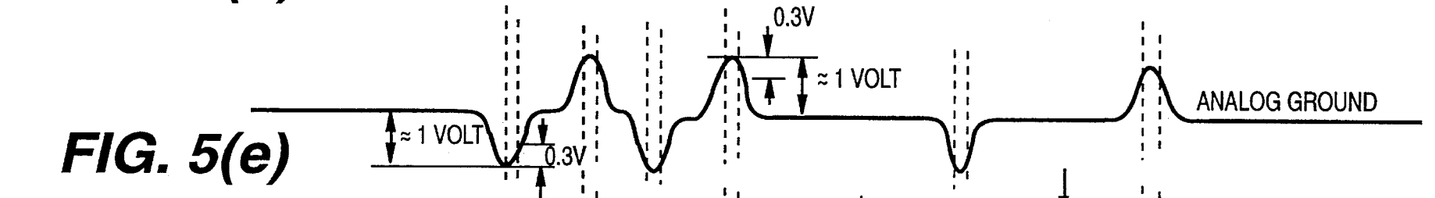
Figure 5F:
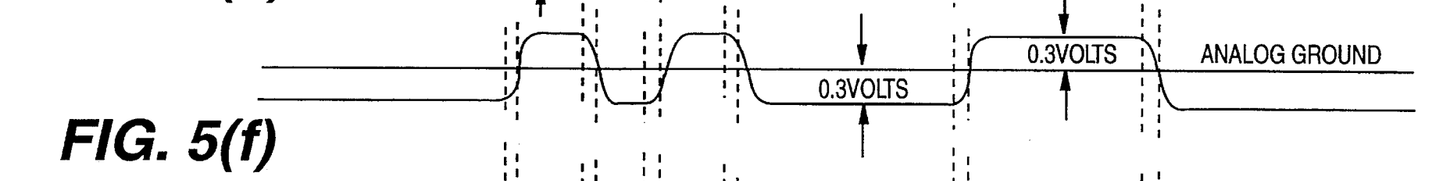
Figure 5G:
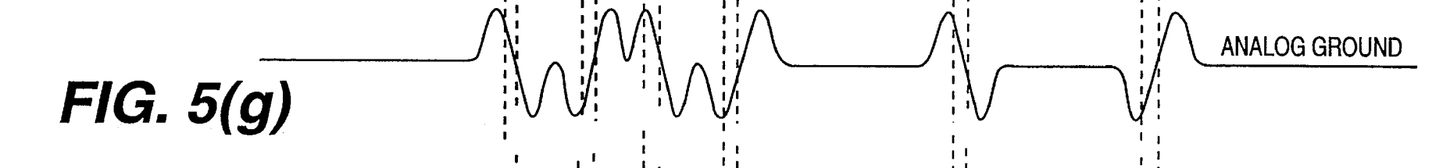

A set of waveforms corresponding to various points of FIGS. 5(a) are shown in FIGS. 5(d)–5(h). FIG. 5(d) shows an analog signal corresponding to the bar code. The analog signal is applied to operational amplifier 252 and converted to a first derivative signal, as shown in the waveform of FIG. 5(e). The first derivative is applied to operational amplifier 254 to generate a second derivative signal of the analog signal, as shown in the waveform of FIG. 5(g).

Figure 5H:
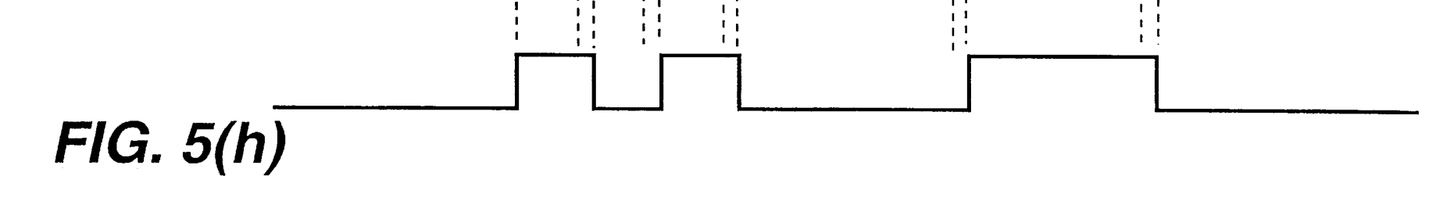
Figure 5I:
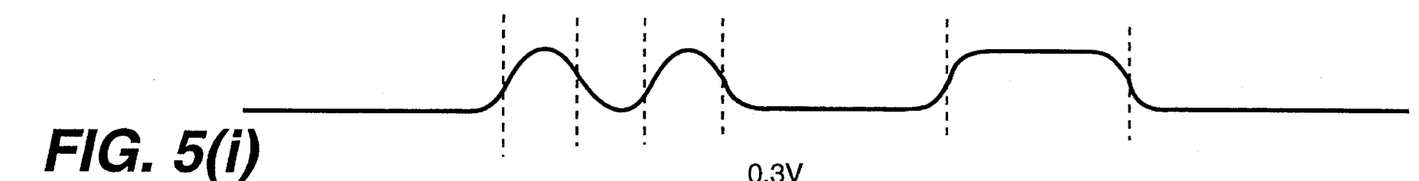
FIGS. 5(i)–5(l) are waveforms at various locations in the circuit of FIG. 5(d).
Figure 5J:
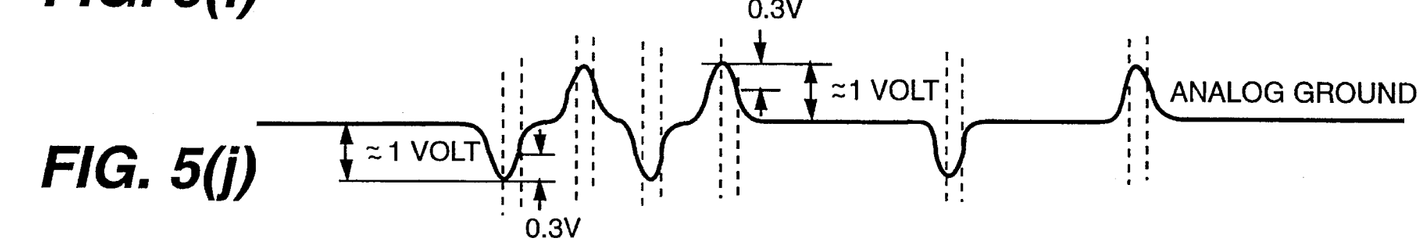
Figures 5K, 5L:
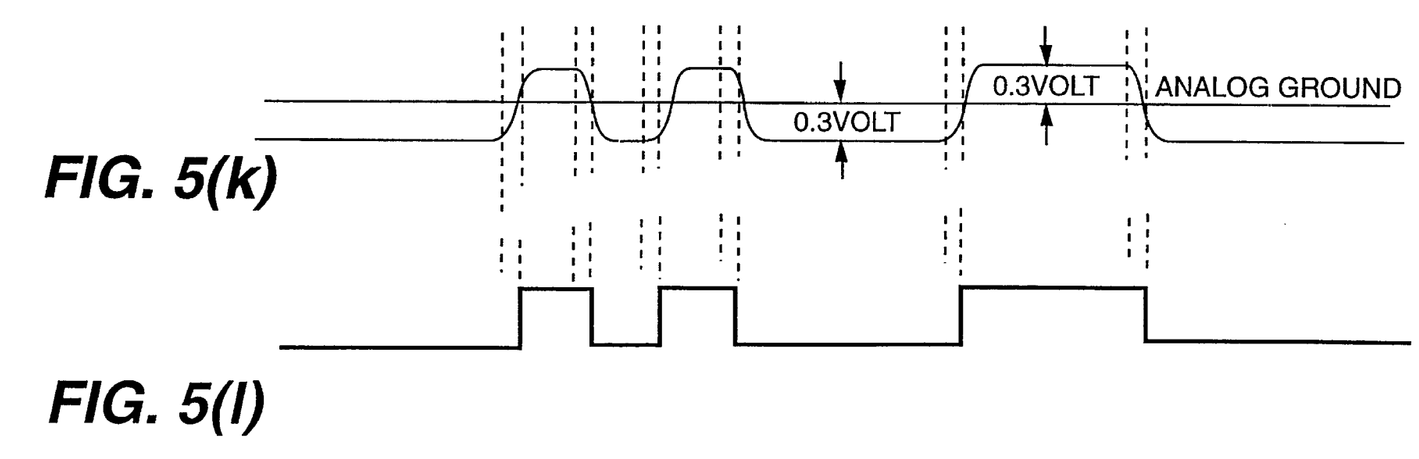

The first derivative signal is also applied to a clamping circuit including 0.01 µf capacitor and a clamping diode (HSCK 1001, for example), which clamps the first derivative signal to a set voltage above and below the analog ground (0.3 volt, for example). FIG. 5(f) shows the waveform produced from the clamping circuit which is applied to the non-inverting input of the comparator 256. The second derivative signal from operational amplifier 254 is applied to the inverting input of the comparator 256. The FIG. 5(h) shows the output of the comparator 256.

A set of waveforms corresponding to various points of FIG. 5(b) are shown in FIGS. 5(i)–5(l). FIGS. 5(i)–5(l) are similar to FIGS. 5(d)–5(k) except that FIGS. 5(i)–5(l) do not include a second derivative signal of the analog signal because the comparator 256 of FIG. 5(b) compares the waveform of FIG. 5(k) to the analog ground.

Figure 6:
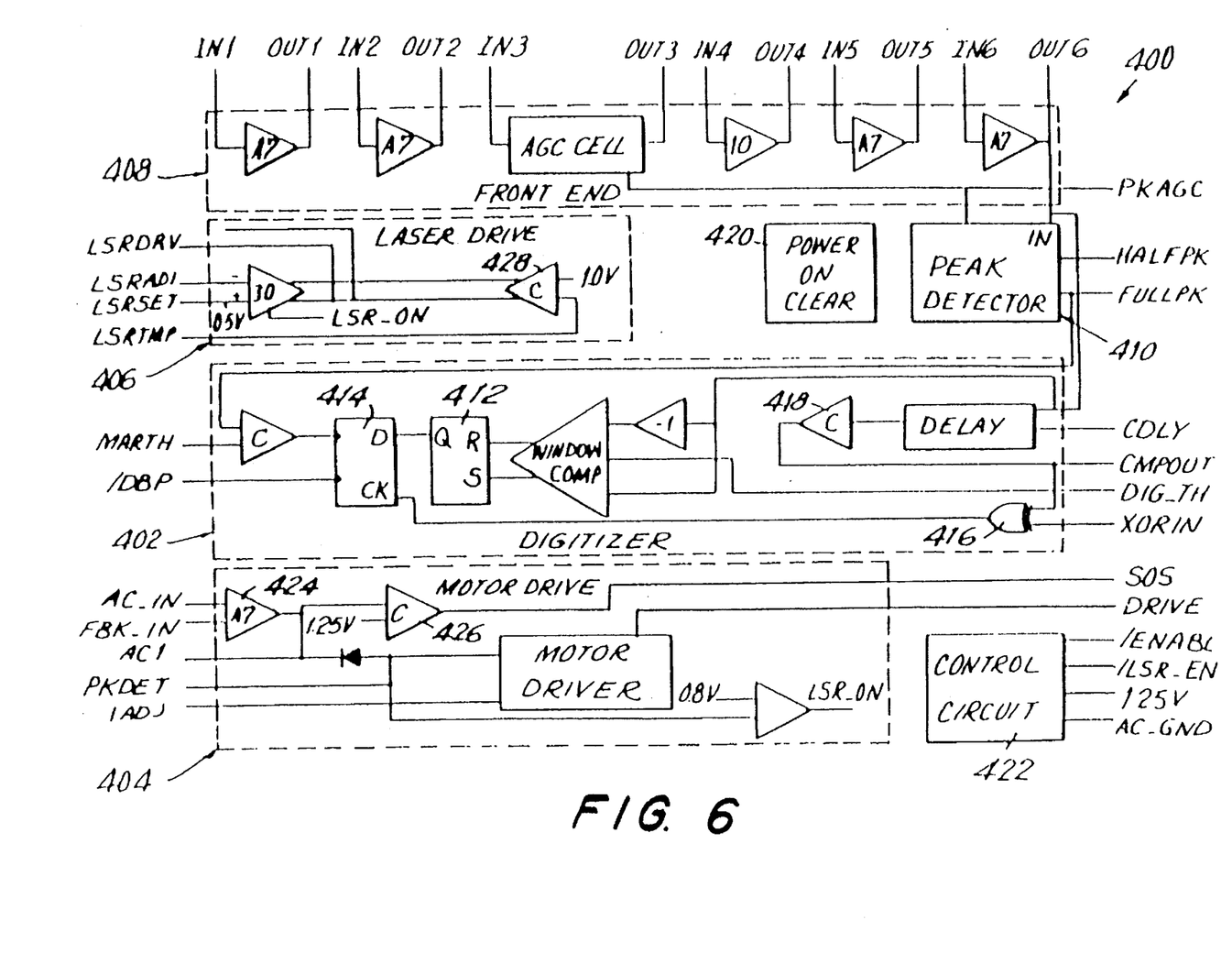
FIG. 6 is a block diagram of an integrated circuit chip on which a digitizer circuit is incorporated.

FIG. 6 depicts a single chip custom linear circuit 400 that incorporates many functions, thereby achieving a high performance scanner with much fewer components. The chip 400 includes a digitizer 402, such as the signal processing circuits 38, 200, 240, 250, 300 of FIGS. 2, 13, 15, 17 and 18, respectively; a motor drive circuit 404, such as identified by component 39 in FIG. 2; a laser drive circuit 406, such as identified by component 40 in FIG. 2; and a front and end 408 including an automatic gain control circuit for controlling the gain (40 dB range) of the analog signal generated by the photosensor prior to being conducted to the digitizer circuit.

The front end 408 transforms the electrical current analog signal from the photosensor into a voltage signal, filters, amplifies and readies it for use by the digitizer. Conditioning of the signal includes proper amplification via the AGC cell as well as removal of noise and the effects of ambient light.

Total voltage gain is externally selectable and can be greater than 60 dB. Therefore, the current input node (IN1) is critically dependent on the integrated circuit as well as printed circuit board layout to minimize undesirable feedback and/or oscillation.

The equivalent input noise current and voltage of the first amplifier (IN1) is most critical since it determines the minimum detectable signal and therefore limits the dynamic range of the whole system. Layout which minimized crosstalk for this first stage is paramount. Trenching, if at all possible, and techniques for limiting substrate currents are highly desirable.

Also important is that the input bias current of the AGC control input (PKAGC), be minimized to reduce drooping on the peak detector capacitor voltage between scans which is typically 27 msec. The capacitor is held to 1 µF or less for the purposes of maintaining fast AGC attack times and a physical size that is consistent with the scanner's application.

A peak detector 410 consists of a phase spitter/buffer input stage and two full wave and a single wave peak detector stage. The spilt buffered signal is used to feed the digitizer 402 as well as the peak detector's source followers. The peak detector's output transistors are capable of supplying the surge current needed to quickly charge the loading capacitor (as limited by the series resistors), and are also capable of withstanding the worst case reverse voltage (e.g., greater than 5 volts) without breaking down.

The peak detector 410 is used to feedback a control voltage signal for the AGC cell; to provide a signal tracking threshold for the digitizer's window comparator; and to feed signal status information to the digitizer's MARGIN circuit, in those applications where the AGC cell is not used.

The digitizer 402 is the heart of the scanner. It is here that the conditioned analog signal is analyzed and broken down to create the electronic equivalent of the bar code symbol being read. One branch of the digitizer is a window comparator with a variable threshold.

The threshold tracks the analog signal's amplitude, to maintain the highest possible signal-to-noise ratio for all possible amplitudes.

Such provision allows highly accurate reads every single scan, when the signal levels are high enough, but will adapt itself for a lower signal-to-noise ratio, for those times when the signal is feeble and a few scans might be required to obtain a read.

The output pulses of the window comparator are used to trigger the SET (S) and RESET (R) inputs of a flip-flop 412, thus producing a square wave that is representative of the symbol being read. For precise timing information (i.e., phase), an additional D-type flip-flop 414 is used and is clocked from the output of the exclusive-OR gate 416 which is part of a delay loop branch of the digitizer. The delay loop is used to extract timing information from the incoming signal so that phase distortion due to transitional speed and circuit response variation is virtually eliminated. It works by first delaying the signal and then feeding it and its delayed self to the two inputs of a comparator 418 with a properly selected amount of hysteresis.

The amount of the delay is selected so that the signal and its delayed version cross (and therefore cause the comparator to change state) at a point near the peaks, thus providing a degree of noise immunity higher than that possible at the zero crossing transitions, which yields less overall phase distortion.

The first derivative of the square wave so generated at the output of the comparator 418 is then fed to the exclusive-OR gate 416 (which is nothing more than another window comparator with fixed thresholds), the output of which is then used to clock the symbol data out of the D-type flip-flop 414, with a greater degree of phase integrity than would otherwise be possible.

The comparator 418 has the most demanding requirements for this subcircuit, because it must respond to signals whose peak amplitude is as low as 50 mV. The comparator 418 changes states very close to signal peaks and allows for as much as 15 mV of hysteresis. Hence, the gain and bandwidth must be as large as possible (135 dB of DC gain; 85 dB at 2 mHz and 0 dB at 43 MHz are preferred values under conditions of 5 V when biased for low frequency mode.)

A response delay of no more than 600 nsec for 10 mV overdrive under the conditions of low frequency mode bias is needed, with 300 nsec desirable.

The difference between rise time delay and fall time delay (at 10 mV overdrive) must be less than 450 nsec for the low frequency mode bias and 250 nsec for the high frequency mode bias to maintain phase distortion within tolerable limits. Delay difference of less than 100 nsec is highly desirable for both conditions.

The output stage of the comparator must be capable of swinging to within 1 V from each rail as a minimum when driving a load of 16 K ohms (the input impedance of the gate 416 is 20 K ohms ±20%).

The gate 416 output pulse width must be a minimum of 1.5 μsec as measured at the halfway point, for all conditions (worst case is low frequency mode) when the gate common input (XORIN) is coupled to the comparator output via a 15 pF to 22 pF capacitor. For adequate noise immunity the gate thresholds are set 250 mV above and below the common input DC level of 1 V.

The D-type flip-flop 414 must be capable of clocking data when the clock pulse width is 1.5 μsec.

The power-on clear circuit 420 is used to clear the flip-flop 414 and avoid overcharging of the peak detector's capacitors when power is first applied. This operation is necessary to insure that a decode is possible for the very first scan.

The power-on clear circuit 420 works by sensing the rail and the heavily bypassed AC GROUND hub. Its output is active until the voltage at AC GROUND reaches the value of 1 Vbe, at which point it becomes inactive, thus releasing the peak detector and flip-flop 414 for proper operation.

The control circuit 422 commands the whole chip operation. The way it does so is by generating all reference voltages and the AC GROUND used by all subcircuits.

Two input control lines are designed to allow open collector or CMOS drives. One input (/ENABL) activates a 1.25 V bandgap reference which, in turn, activates all subcircuits except the laser drive. When this one input has a high voltage, the circuit is disabled and draws a maximum of 100 μA (e.g., SLEEP MODE).

A low voltage applied to the other input (LSR.EN) enables the laser drive subcircuit 406 which requires that a low voltage be applied to /ENABL input, as well, for operation.

The motor drive circuit 404 is not interactive with any of those discussed thus far, except for the control circuit 422 which provides the 1.25 V reference.

When first powering up, the output of a sensing amplifier 424 rises towards the AC GROUND voltage level (its rest state). This transition is coupled to the input of a driving amplifier 426 via an external capacitor.

The initial surge provides the initial kick that gets the motor started. Once started, a sensing coil will provide the induced EMF to the sensing amplifier which then commands the driving amplifier to provide the regenerative drive to the motor coil. The motor acts as a high Q feedback element to control the oscillating frequency.

The output of the driving amplifier is used to drive a start-of-scan (SOS) external comparator which changes state every time the signal crosses zero.

The laser drive circuit 406 consists mainly of an operational amplifier, whose inputs are lowpass filtered to prevent high frequency noise (e.g., RF, EMI) from being integrated by the amplifier and damaging the laser by overdriving it.

This amplifier also has two outputs. One can source up to 5 mA of current to be used to drive an external drive that drives the laser, but can only swing to within one volt from Vcc.

A second one, which can only source or sing 60 μA, is used to drive an external FET that drives the laser and is capable of swinging to within 250 mV from each rail.

The LSRADJ input is used for the dual purpose of trimming the laser current via an external potentiometer to ground and also for sensing the feedback current from the photosensor. This allows the laser current to be set and continuously regulated.

The laser drive circuit 406 is shut down when any one or all of the following conditions are met:

(a) Over intensity condition;

(b) Motor failure condition;

(c) Over temperature condition;

(d) A logic high signal applied at the LAS.EN terminal.

An over intensity condition is sensed via the laser diode's internal monitor photosensor (which also provides continuous regulation) by direct connection into the amplifier feedback loop at the LSRADJ input terminal.

A motor failure condition is controlled by the motor drive circuit and shuts down the laser if the motor fails to swing above a predetermined swing amplitude.

An over temperature condition is controlled by a comparator 428, which compares an internally set reference voltage to one obtained by voltage division of the bandgap reference, via an external resistor-thermistor pair that is connected to the comparator's remaining input, externally ported as "LSRTMP".

It will be understood that each of the elements described above, or two or more together, also may find a useful application in other types of constructions differing from the types described above.

While the invention has been illustrated and described as embodied in a stand-alone fixture for converting the operation of a hand-held laser scanner, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic of specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A circuit for digitizing an analog signal generated from a photoelectronic conversion of light reflected off scanning indicia having spatially-separated, light-reflected portions, comprising:

differentiating means for receiving the analog signal and for generating a first derivative signal of the analog signal;

means for adjusting the first derivative signal; means for generating an analog ground signal;

means for comparing the analog ground signal and the adjusted first derivative signal and for generating a digital signal representing the indicia being scanned; and output means for outputting a digital output signal corresponding to the digital signal.

2. The circuit for digitizing an analog signal according to claim 1, wherein the output means includes margin threshold means for adjusting the digital signal.

3. The circuit for digitizing an analog signal according to claim 2, including means for adjusting the first derivative signal by a predetermined value, and wherein the margin threshold means includes a comparator with a non-inverting input connected to the differentiating means and to an inverting input through the adjusting means.

4. The circuit for digitizing an analog signal according to claim 3, wherein the adjusting means includes a diode.

5. The circuit for digitizing an analog signal according to claim 3, wherein the margin threshold means further includes a transistor, the base of the transistor being connected to an output of the comparator and a collector of the transistor being connected to the output means.

6. The circuit for digitizing an analog signal according to claim 2, wherein the output means includes a transistor, the base of the transistor being connected to the output of the digital signal generating means and to the output of the margin threshold means.

7. The circuit for digitizing an analog signal according to claim 1, wherein the means for adjusting the first derivative signal includes clamping means connected between the differentiating means and the comparing means for clamping voltage peaks of the first derivative signal.

8. The circuit for digitizing an analog signal according to claim 7, wherein the clamping means includes a capacitor connected in series to a pair of diodes connected in parallel.

9. The circuit for digitizing an analog signal according to claim 7, wherein the digital signal generating means includes a comparator with an inverting input connected to receive the analog ground signal and a non-inverting input connected to the clamping means.

10. A circuit for digitizing an analog signal generated from a photoelectronic conversion of light reflected off the scanning indicia having spatially-separated, light-reflective portions, comprising:

a differentiator circuit for generating a first derivative signal representing a first derivative of the analog signal;

an analog ground circuit for generating a signal representative of analog ground;

a clamping circuit for clamping voltage peaks of the first derivative signal;

a first comparator for comparing the analog ground signal to the clamped first derivative signal to generate a digital signal representing the indicia being scanned; and an output means for outputting a digital output signal corresponding to the digital signal.

11. The circuit for digitizing an analog signal according to claim 10, wherein the output means includes a margin threshold circuit for adjusting the digital signal.

12. The circuit for digitizing an analog signal according to claim 11, wherein the output means includes a transistor, the base of the transistor being connected to the first comparator and to the output of the margin threshold circuit.

13. The circuit for digitizing an analog signal according to claim 12, wherein the margin threshold circuit further includes a transistor, the base of the transistor being connected to an output of the second comparator and a collector of the transistor being connected to the output means.

14. The circuit for digitizing an analog signal according to claim 11, further including means for adjusting the first derivative signal by a predetermined value, and wherein the margin threshold circuit includes a second comparator with a non-inverting input connected to the differentiating means and with an inverting input connected to the adjusting means.

15. The circuit for digitizing an analog signal according to claim 14, wherein the adjusting means includes a diode.

16. The circuit for digitizing an analog electric signal according to claim 10, wherein the clamping circuit includes a capacitor connected in series to a pair of diodes connected in parallel.

17. A method of digitizing an analog signal generated from a photoelectronic conversion of light reflected off the scanning indicia having spatially-separated, light-reflective portions, including the steps of:

generating a first derivative signal representing a first derivative of the analog signal;

generating a signal representative of analog ground;

clamping voltage peaks of the first derivative signal;

comparing the analog ground signal to the clamped first derivative signal to generate a digital signal representing the indicia being scanned; and outputting a digital output signal corresponding to the digital signal.

18. The method of digitizing an analog signal according to claim 17 wherein the step of outputting a digital output signal further includes the step of adjusting the digital signal by gating off the digital signal when the amplitude of the first derivative signal is less than a predetermined level.

19. The method of digitizing an analog signal according to claim 18 wherein the adjusting step further includes the steps of:

generating an altered signal by adjusting an amplitude of the first derivative signal; and comparing the first derivative signal to the altered signal.

20. A circuit for digitizing an analog signal generated from a photoelectric conversion of light reflected off scanning indicia having spatially-separated, light-reflective portions, comprising:

means receptive of the analog signal for generating a first derivative signal of the analog signal;

means for adjusting the first derivative signal to eliminate noise therein; and output means receptive of the first derivative signal and the adjusted first derivative signal for outputting a digital output signal representative of the indicia being scanned.

21. A circuit for digitizing an analog signal generated from a photoelectric conversion of light reflected off scanning indicia having spatially-separated, light-reflected portions, comprising:

means receptive of the analog signal for generating a digital signal from a first derivative signal of the analog signal and representing the indicia being scanned; and output means receptive of the digital signal and the first derivative signal for outputting a digital output signal wherein portions of the digital signal are gated off when the amplitude of the first derivative signal is less than a predetermined level.

* * * * *